(12) United States Patent
Blackburn (10) Patent No.: US 9,297,683 B2
(45) Date of Patent: Mar. 29, 2016

(54) PORTION DISTRIBUTION DEVICE

(71) Applicant: Brett J. Blackburn, Fox Point, WI (US)

(72) Inventor: Brett J. Blackburn, Fox Point, WI (US)

(*) Notice: Subject to any disclaimer, the term of this patent is extended or adjusted under 35 U.S.C. 154(b) by 0 days.

(21) Appl. No.: 14/159,734

(22) Filed: Jan. 21, 2014

(65) Prior Publication Data

US 2014/0203050 A1    Jul. 24, 2014

Related U.S. Application Data

(60) Provisional application No. 61/754,734, filed on Jan. 21, 2013.

(51) Int. Cl.
| | |
|---|---|
| *G01F 11/28* | (2006.01) |
| *G01F 11/26* | (2006.01) |
| *G01F 11/00* | (2006.01) |
| *G01F 11/46* | (2006.01) |
| *A47G 19/34* | (2006.01) |

(52) U.S. Cl.
CPC .............. *G01F 11/261* (2013.01); *A47G 19/34* (2013.01); *G01F 11/003* (2013.01); *G01F 11/28* (2013.01); *G01F 11/46* (2013.01); *Y10T 29/49826* (2015.01)

(58) Field of Classification Search
CPC ....... G01F 11/28; G01F 11/003; G01F 11/46; A47G 19/34
USPC ........... 222/424.5–457.5, 480–489, 567–568, 222/570, 189.02–189.11, 39
See application file for complete search history.

(56) References Cited

U.S. PATENT DOCUMENTS

| | | | | |
|---|---|---|---|---|
| 2,898,010 | A * | 8/1959 | Tepper | 222/339 |
| 3,308,995 | A * | 3/1967 | Lee et al. | 222/427 |
| 6,283,339 | B1 * | 9/2001 | Morrow | 222/452 |
| 6,299,033 | B1 * | 10/2001 | VerWeyst et al. | 222/480 |
| 6,550,640 | B2 | 4/2003 | Smith | |
| 6,601,734 | B1 | 8/2003 | Smith | |
| 2006/0076369 | A1 * | 4/2006 | McGuyer | A47G 19/34 222/434 |

* cited by examiner

*Primary Examiner* — Kevin P Shaver
*Assistant Examiner* — Andrew P Bainbridge
(74) *Attorney, Agent, or Firm* — Ziolkowski Patent Solutions Group, SC (57) ABSTRACT

A portion distribution device for portioning substances from a container in pre-defined increments is disclosed. The portion distribution device includes a portion divider having a portion opening, and a measurement chamber body rotatively coupled to the portion divider. The measurement chamber body includes a plurality of chambers equal in volume and a base joined to the plurality of chambers, with the base constructed to be selectively connected to the container. The portion distribution device also includes a lid rotatively coupled to the measurement chamber body, with the lid further including a top surface having at least one lid opening formed therethrough, at least one flap operative to close the at least one lid opening, and a rod extending downward from the top surface, through the measurement chamber body, and coupled to the portion divider.

22 Claims, 5 Drawing Sheets

PORTION DISTRIBUTION DEVICE

CROSS-REFERENCE TO RELATED APPLICATION

The present application is a non-provisional of, and claims priority to, U.S. Provisional Patent Application Ser. No. 61/754,734, filed Jan. 21, 2013, the disclosure of which is incorporated herein by reference.

BACKGROUND OF THE INVENTION

Embodiments of the invention relate generally to measuring tools and, more particularly, to a portion distribution device for portioning substances in pre-defined increments and method of assembly thereof.

Dispensing substances from containers in specific amounts—such as a spice from a spice container—generally requires use of a measuring tool. The use of a measuring tool separate from the container, such as a measuring spoon, is often cumbersome and may also be disadvantageous. That is, the correct size tool may not be readily available—thereby causing inaccurate measurements. Additionally, the tool may cause contamination problems if used previously to measure a different substance. Still further, use of a separate tool may allow for accidental spilling or contamination by airborne particles.

Measuring tools integrated into a cap on the container alleviate some of the aforementioned problems. Some containers include a cap having several different sized openings. The openings regulate the rate at which material is distributed from the container. However, such caps require a separate timing device if the total volume distributed is to be controlled. Other caps include measuring chambers having various volumes for measuring substances. Distributing material from these caps often requires many steps. The container must be inverted to fill the measuring chamber with the substance to be distributed, and then the chamber inlet must then be closed before the outlet is opened in order to prevent unmeasured substance from flowing through the chamber. Further, the container may be required to be turned upright before dispensing in order to select the appropriately sized chamber to dispense. The steps must be repeated in order to dispense additional increments of the chamber volume.

Measuring caps for small containers often are limited to dispensing up to 1 teaspoon at a time because they are not large enough to accommodate chambers having larger volumes like a tablespoon. In order to dispense a tablespoon, the multiple inverting and chamber opening steps stated above must be repeated a number of times. Further, these measuring caps have multiple size chambers, which may accidently lead to the wrong amount being distributed, and the chamber sizes may be too large to accommodate small amounts desired to be distributed.

Therefore, it would be desirable to design a portion distribution device that makes measuring substances easier, without the need for measuring spoons. It would further be desirable to provide a portion distribution device that increases speed in which a substance is measured or portioned, and for portioning substances in pre-defined increments.

BRIEF DESCRIPTION OF THE INVENTION

Embodiments of the invention are directed to a portion distribution device and method of assembling thereof, with the portion providing for the portioning and dispensing of substances in pre-defined increments in a fast and accurate fashion.

In accordance with one aspect of the invention, a portion distribution device for portioning substances from a container in pre-defined increments includes a portion divider having a portion opening and a measurement chamber body having first and second ends and rotatively coupled to the portion divider at the first end, with the measurement chamber body further including a plurality of chambers equal in volume and each having an inlet opening and outlet opening and a base joined to the plurality of chambers so as to be positioned at the first end of the measurement chamber body, the base constructed to be selectively connect to the container. The portion distribution device also includes a lid rotatively coupled to the second end of the measurement chamber body, with the lid further including a top surface having at least one lid opening formed therethrough, at least one flap operative to close the at least one lid opening, and a rod extending downward from the top surface, through the measurement chamber body, and coupled to the portion divider.

In accordance with another aspect of the invention, a container top for dispensing a substance from a container in equal volume increments includes a measurement chamber body having a first and second end, with the measurement chamber body including a base located at the first end and configured to attach to a container and a wall structure coupled to the attachment section and constructed to define a plurality of chambers having equal volume. The container top also includes a portion divider rotatively coupled to the first end of the measurement chamber body and having a portion opening providing a chamber inlet by which each respective chamber of the measurement chamber body can be selectively filled with the substance from the container. The container top further includes a lid covering the second end of the measurement chamber body, with the lid including a top surface having an opening formed therein that provides a chamber outlet by which each respective chamber of the measurement chamber body can be selectively emptied and a shaft extending down from the top surface, through the measurement chamber body, and coupled to the portion divider. The lid is coupled to the portion divider by way of the shaft such that rotation of the lid causes a matching rotation of the portion divider to selectively align the portion opening with a respective chamber in the measurement chamber body, so as to enable selective filling of each of the plurality of chambers in the measurement chamber body with the substance in the container.

In accordance with a further aspect of the invention, a method of assembling a portion distribution device includes supplying a measurement chamber body having first and second ends, wherein the measurement chamber body comprises includes a plurality of chambers equal in volume wherein each chamber has an inlet opening and outlet opening, and a base configured to connect to a container. The method also includes rotatively coupling a portion divider to a first end of a measurement chamber body such that a portion opening in the portion divider can be rotated and selectively aligned with each of the plurality of chambers and rotatively coupling a lid to the second end of a measurement chamber body, wherein the lid has at least one lid opening and at least one flap operative to close the opening. The method further includes coupling the lid to the portion divider via a rod extending from the lid, through the measurement chamber body, and that mates with the portion divider. The lid is coupled to the portion divider such that rotation of the lid causes a matching rotation of the portion divider, so as to selectively align the portion opening with a respective chamber in the measurement chamber body and enable selective filling of each of the plurality of chambers in the measurement chamber body with a substance from the container.

These and other advantages and features will be more readily understood from the following detailed description of preferred embodiments of the invention that is provided in connection with the accompanying drawings, and it is intended that these advantages and features are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the invention are directed to a portion distribution device and method of assembling thereof, with the portion providing for the portioning and dispensing of substances in pre-defined increments in a fast and accurate fashion. While embodiments of the invention are described and illustrated here below for use with dispensing spices from a spice container, such description is not meant to limit the scope of the invention. Those skilled in the art will recognize that the portion distribution device may have other various applications and uses beyond that specifically described herein, and that such applications are considered to be within the spirit and scope of the invention.

Figure 1:
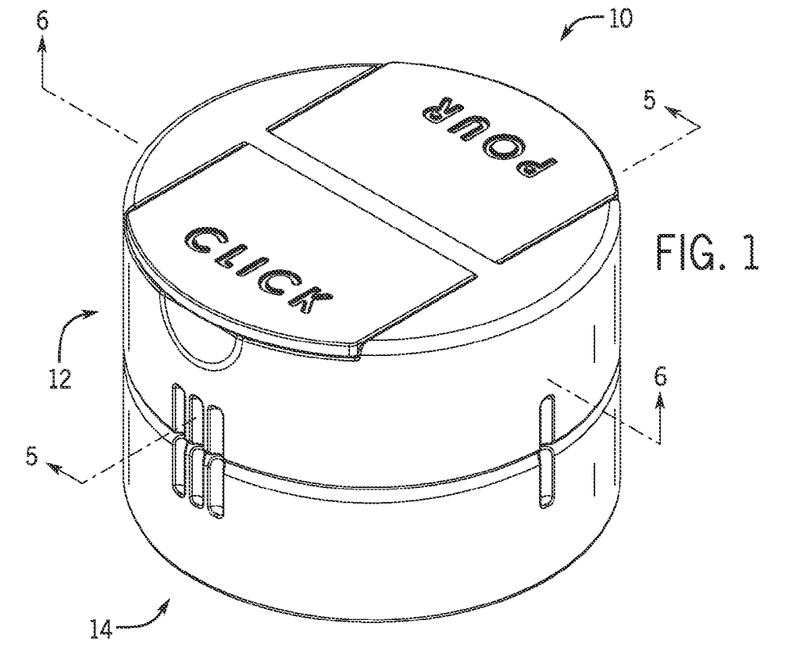
FIGS. 1 and 2 are perspective views of a portion distribution device, according to an embodiment of the invention.
Figure 2:
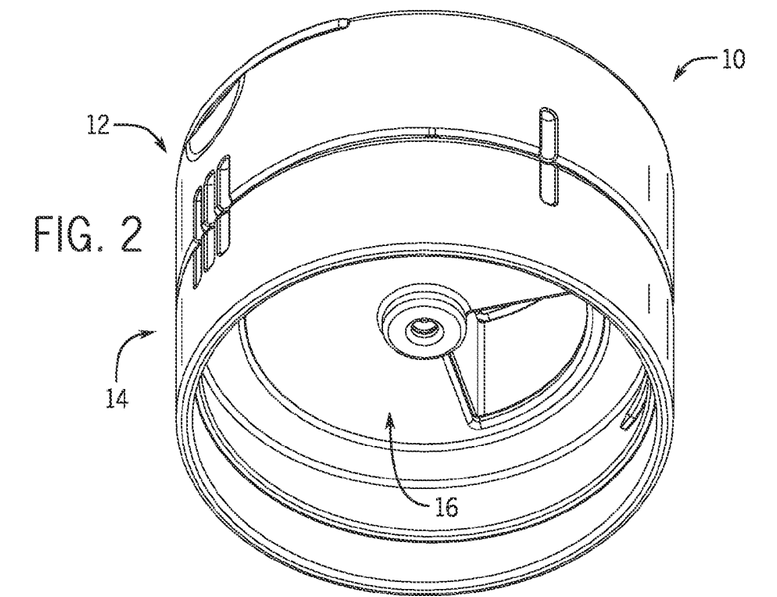

Referring first to FIGS. 1 and 2, isometric views of a portion distribution device 10 are shown according to an embodiment of the invention. The portion distribution device 10 is constructed to be secured to a container or source of a substance to be distributed, with the specific construction and sizing of the portion distribution device 10 being adapted to fit its specific application (i.e., the container to which it is to be attached. The material to be dispensed from the portion distribution device 10 may include various substances, including liquids, dry goods, or other materials, and according to an exemplary embodiment, the portion distribution device 10 is adapted for use in portioning and distributing spice from a spice bottle.

The portion distribution device 10 generally includes what can be referred to as a lid 12, a measurement chamber body 14, and a portion divider 16. The lid 12, measurement chamber body 14, and portion divider 16 function cooperatively so as to enable a user to measure and portion a substance in pre-defined increments using just the portion distribution device 10, without a need for separate measuring tools or devices. In use, a user may simply attach the portion distribution device 10 onto a spice bottle or other container, and invert the container, and selectively rotate the lid 12 relative to the measurement chamber body 14 to fill the measurement chamber body 14 with a desired/measured amount of spice. At any time, the user can conveniently dispense the substance out through the lid 12 in premeasured increments.

Referring now to FIGS. 3-8, various views of the portion distribution device 10 are provided that better illustrate each of the lid 12, measurement chamber body 14, and portion divider 16, so as to provide a more accurate view and description of the construction of each particular component. Referring first to FIGS. 3-6, the measurement chamber body 14 used in the portion distribution device 10 is illustrated, according to an exemplary embodiment of the invention. The measurement chamber body 14 is constructed as a cylindrical structure that is generally defined to include a wall structure 18 formed at a first (upper) end 20 of the body and a base 22 formed at a second (lower) end 24 of the body, with the wall structure 18 being coupled to the base 22 in an integral fashion. The wall structure 18 is formed to include a plurality of dividers 26 extending radially outward from a shaft 28 that defines a central axis hole 30, with the axis hole 30 providing for attachment of the portion divider 16 to the lid 12, as will be explained in greater detail below. The wall structure 18 also includes a cylindrical outer wall 32 surrounding the dividers 26 and joined thereto to define/form a plurality of chambers 34. The chambers 34 have an opening facing the bottom end of the measurement chamber body 14—an inlet opening 36—and another opening facing the upper end of the measurement chamber body 14—an outlet opening 38.

The dimensions and arrangement of the dividers 26 is such that each chamber 34 has an equal pre-measured volume. In one embodiment, each of the plurality of chambers 34 has a volume of ½ teaspoon, although it is recognized that the chambers 34 could be modified to meet other measurement options (e.g., ¼ teaspoon, etc.). For instance, the chambers 34 may be manipulated to accommodate different sizes, dimensions, or measurements. In operation of the portion distribution device, the measurement chamber body 14 allows a user to selectively and individually fill each of the chambers 34 with a desired substance while measuring the substance at the same time. When the spice bottle is turned upside down it will fill chambers 34 with a pre-measured amount of spice.

According to one embodiment, the base 22 of the measurement chamber body 14 includes grooves 40 formed on an inner surface thereof that are constructed to screw onto and be connected with the source of the substance to be distributed. In one embodiment, the base 22 includes grooves 40 that are adapted to screw onto a spice bottle for measuring and distributing spice. Accordingly, the base 22 connects with the desired spice bottle by screwing the base 22 on to the bottle using the screw grooves 40. It is recognized that the height and circumference of the base 22 may be modified to accommodate different size containers/bottles. Alternatively, rather than selectively screwing the portion distribution device 10 to a bottle via the grooves 40 in base 22, it is recognized that the portion distribution device 10 could be permanently attached to the bottle.

According to one embodiment, the measurement chamber body 14 also includes ratcheting grooves 42 formed thereon that operate with the lid 12 to create a ratcheting affect when the lid 12 is rotated relative to the measurement chamber body 14. The grooves 42 may be cut into the cylindrical outer wall 32 of wall structure 18 to allow for a ratchet like feel when turning the lid 12.

Referring now to FIGS. 3-5 and 7, the portion divider 16 used in the portion distribution device 10 is shown being constructed as a thin disc-like structure that has an opening 44 adjacent to the disc center. According to an exemplary embodiment, opening 44 may be of equivalent geometry to the inlet opening 36 of chamber 34 in the measurement chamber body 14. The portion divider 16 has top and bottom surfaces 46, 48 thereof, with the top surface abutting the wall structure 18 that defines the chambers 34 and acting as a floor for the spice or substance if the bottle is put back upright allowing substance to remain in the chambers 34 in its measured quantity until needed, and the bottom surface being exposed to the opening of the spice bottle to which portion distribution device 10 is attached. As shown in FIGS. 3-5 and 7, the portion divider 16 is positioned on the lower end or underside 24 of the measurement chamber body 14, with the portion divider 16 being positioned inside of base 22 and on the bottom of wall structure 18.

An axis ending 50 is formed at a center point of the portion divider 16, with the axis ending 50 being in the form of a depression that extends outwardly from bottom surface 48. The axis ending 50 provides for alignment of the portion divider with the measurement chamber body 14, with the axis ending receiving the shaft 28 of measurement chamber body 14 to enable such alignment. The portion divider 16 further includes a notch 52 formed in the axis ending 50 on the top surface 46 of the portion divider 16. The notch 52 enables connecting of the portion divider 16 with the lid 12 to align the portion opening 44 in parallel with the lid 12, with the portion divider 16 being secured in position upon coupling of the portion divider 16 to a feature of the lid 12, as will be explained in greater detail below.

In operation of portion distribution device 10, the portion divider 16 functions to control the flow of substance in and out of the measurement chamber body 14. The portion divider 16 is used to help regulate excess substance from entering the chambers 34 prematurely and also ensures only one chamber 34 is filled at a time with the desired substance. The bottom 48 prevents the substance from entering the chambers 34 while the portion opening 44 allows the substance to flow into chambers 34.

Figure 3:
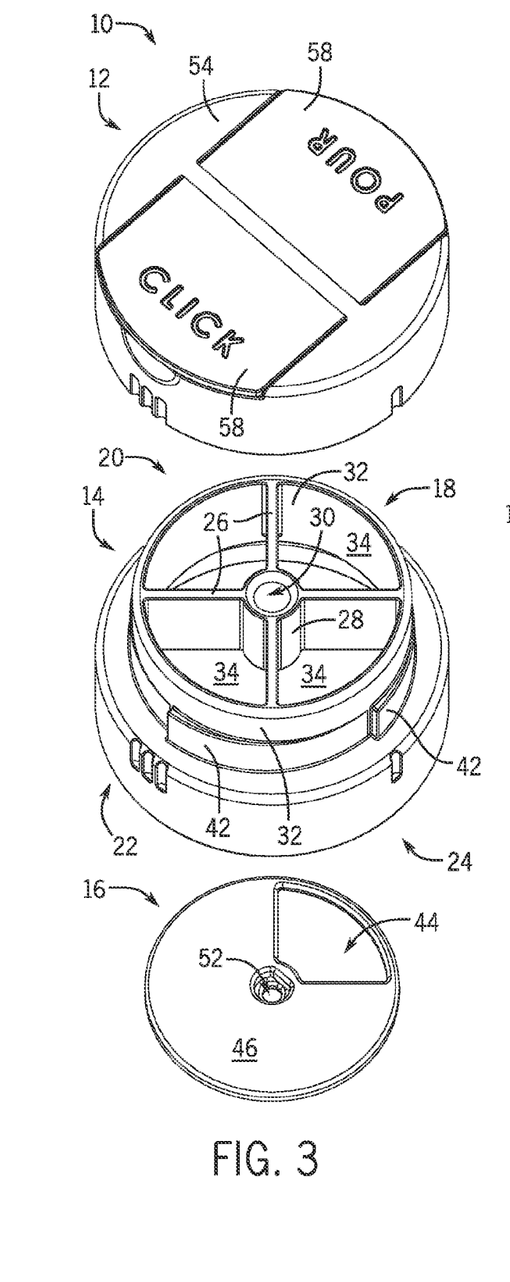
FIGS. 3 and 4 are exploded perspective views of the portion distribution device of FIGS. 1 and 2, including a lid, measurement chamber body, and portion divider, according to an embodiment of the invention.
Figure 4:
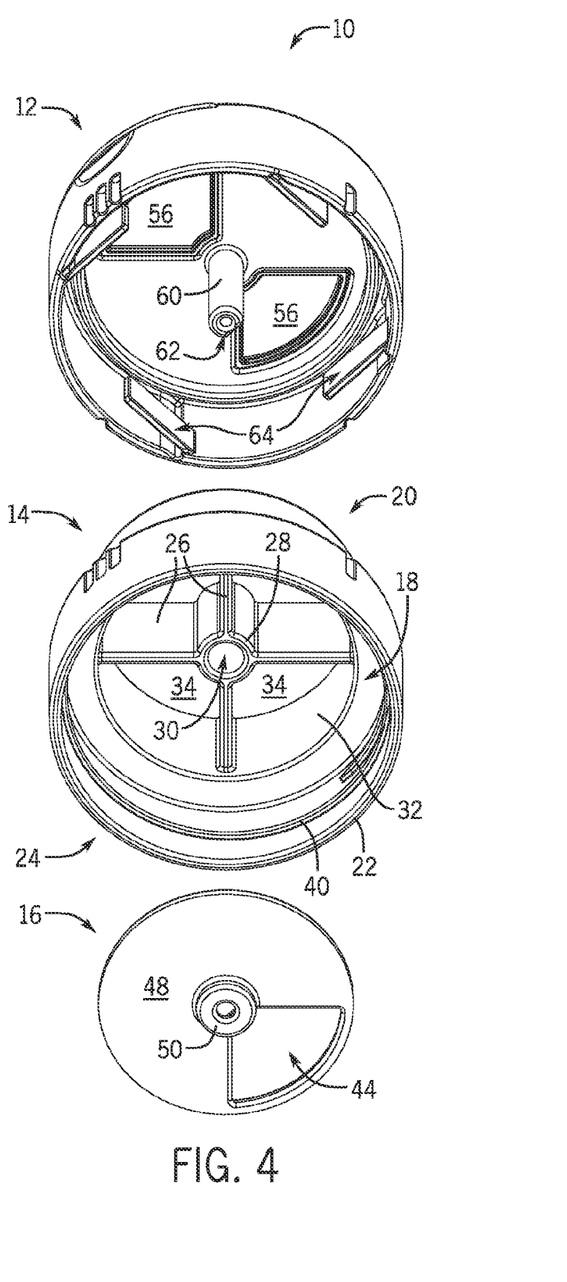
Figure 5:
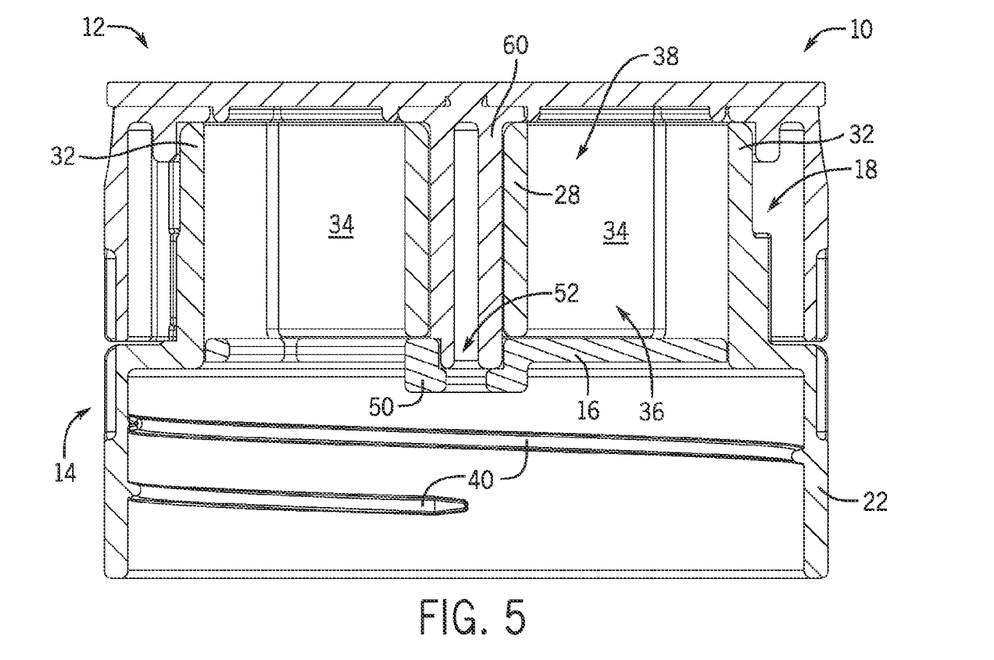
FIG. 5 is a cross-sectional view of the portion distribution device of FIGS. 1 and 2 taken along line 5-5 of FIG. 1.
Figure 6:
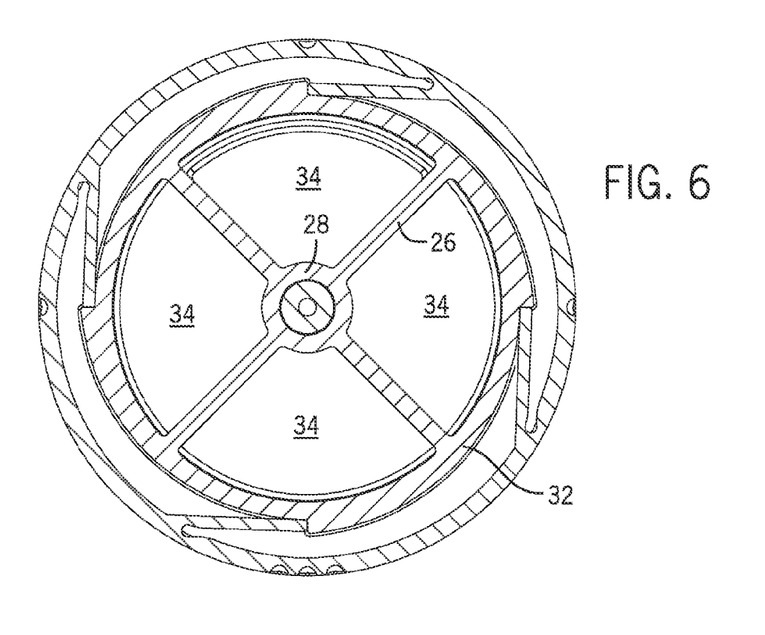
FIG. 6 is a cross-sectional view of the portion distribution device of FIGS. 1 and 2 taken along line 6-6 of FIG. 1.
Figure 7:
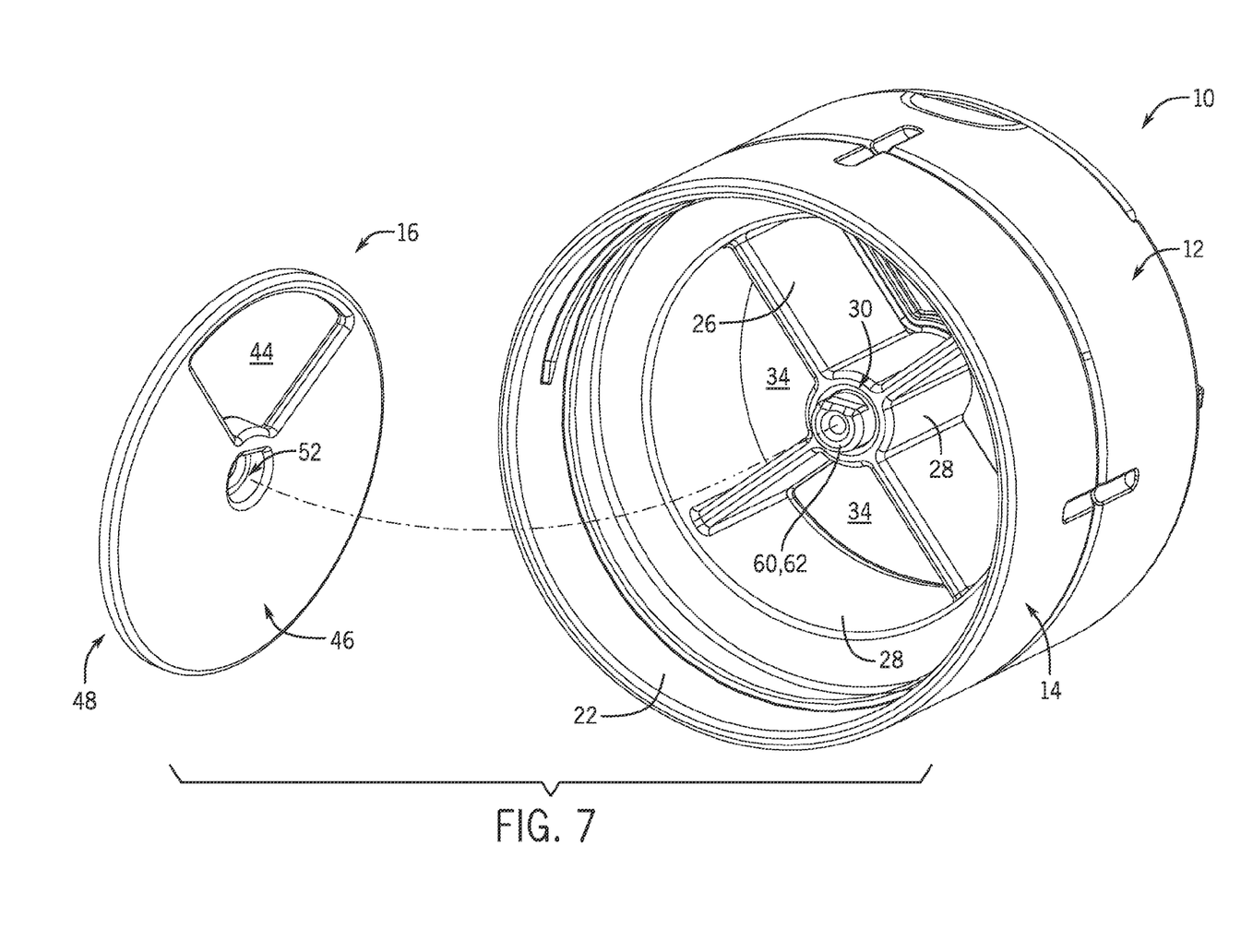
FIG. 7 is a partially exploded perspective view of the portion distribution device of FIGS. 1 and 2, showing positioning of the portion divider relative to the lid and measurement chamber body.
Figure 8:
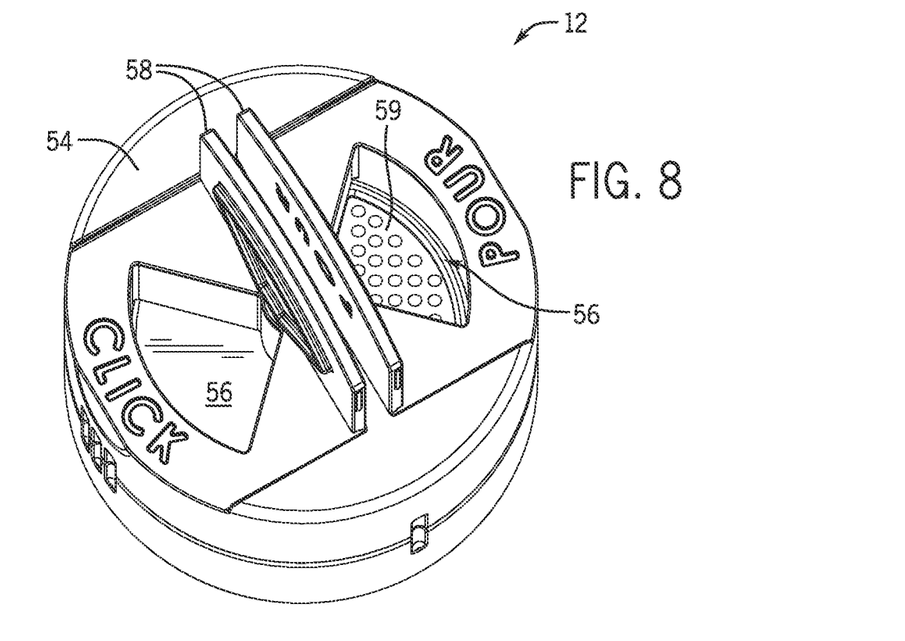
FIG. 8 is a perspective view of the portion distribution device of FIGS. 1 and 2 illustrating openings and flaps formed in and on the lid.

A construction of the lid 12 used of portion distribution device 10 is shown in FIGS. 3, 4 and 8. The lid 12 is circular in structure and functions to contain and control dispensing of the substance in the measurement chamber body 14. The lid 12 includes a top surface 54 having at least one opening 56 that allows the substance to exit chambers 34 for dispensing purposes, with two openings 56 being shown in the illustrated embodiment. The lid 12 may also include flaps 58 to close the openings 56 and prevent the substance from being poured out of the measurement chamber body 14. Flaps 58 may be connected to the lid 12 using various conventional attachment methods found in plastic manufacturing, such as via a plastic hinge-type feature. In operation, one of the openings 56 is utilized for controlled and measured dispensing of a substance from the container—by aligning the opening 56 with an enclosed chamber 34 including a measured portion of the substance therein—while the other opening is utilized for direct pouring—with the opening 56 being kept aligned with the portion opening 44 on the portion divider 16. In one embodiment, the "pour" opening 56 includes a plastic insert piece 59 that snaps therein under the lid 12 is constructed to include a number of apertures therein that enable a user to sprinkle the spice out from the pour opening 56.

As shown in FIG. 4, lid 12 includes a narrow axis rod 60 extending downward from top surface along the axis of the lid 12. The lid 12 is connected with the measurement chamber body 14 and portion divider 16 via the axis rod 34, as the rod extends down through axis opening 30 of measurement chamber body 14 and mating with the axis notch 50/notch 52 of the portion divider 16. The axis rod 34 includes a notch 62 at the end thereof to connect with the notch 52 of the portion divider 16. In one embodiment, the notches 52, 62 connect via a conventional attachment method commonly utilized to snap plastic parts together so as to provide a fixed coupling between lid 12 and portion divider 16. Alternatively, the lid 12 and portion divider 16 could be fastened together through notches 52, 62 by other conventional means, such as screwing together or other methods known in the art.

By fixedly coupling the lid 12 to the portion divider 16, the lid 12 and portion divider 16 are caused to rotate in unison when the lid 12 is turned by a user. The lid 12 and portion divider 16 rotate relative to the measurement chamber body 14, so that while holding a container upside down the substance will fill the chambers 34 through the portion opening 44. The portion opening 44 of portion divider 16 can be selectively aligned with individual chambers 34 of measurement chamber body 14 to selectively fill the chambers 34. The lid openings 56 can also be selectively aligned with the portion opening 44.

In one embodiment of the invention, the lid 12 features an inner ratchet system 64 that operates with the ratcheting grooves 42 of the measurement chamber body 14 to create a "click" as the lid 12 is turned, so as to alert the user when one desired measurement is complete. According to one embodiment, the ratcheting system 64 is constructed such that it interacts with ratcheting grooves 42 every ¼ turn (i.e., 90 degree rotation), so as to alert a user when the portion opening 44 of the portion divider 16 is aligned with a respective chamber 34 in the measurement chamber body 14. The alerting provided by the ratcheting system 64 may be both audible and tactile, to provide redundant feedback to the user regarding rotation of the lid 12.

Figure 9:
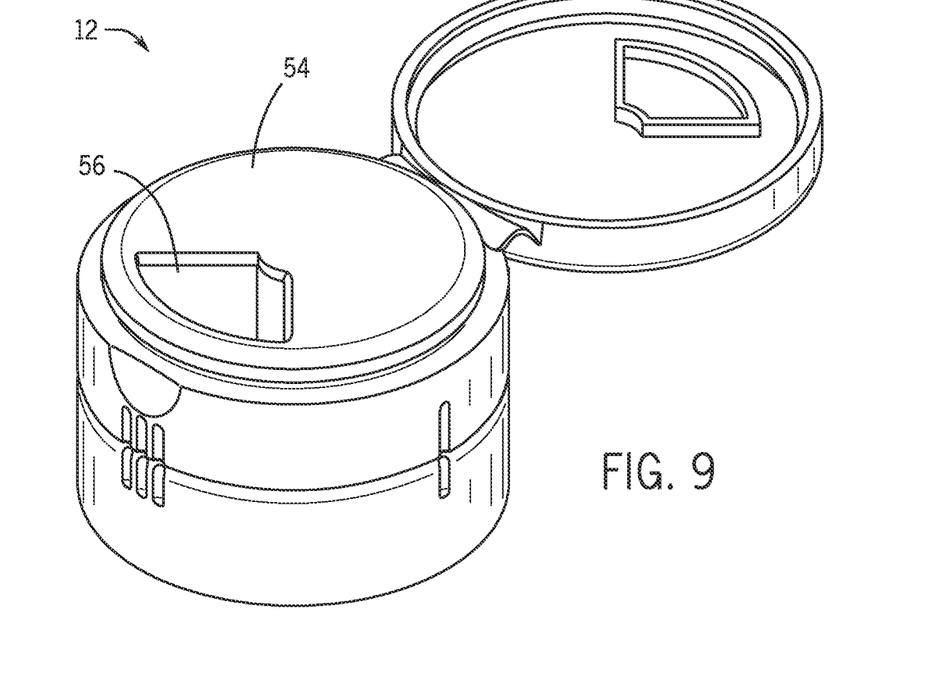
FIG. 9 is a perspective view of a lid for use with the portion distribution device of FIGS. 1 and 2, according to another embodiment of the invention.

While the lid 12 is shown in FIGS. 3 and 4 as included two openings 56, another embodiment of the lid 12—as shown in FIG. 9—may have a single opening 56 and corresponding flap 58. The single opening 56 would provide for only a controlled dispensing from the portion distribution device 10 in pre-defined increments—without having an opening that provides for a direct pouring of unmeasured quantity. In the embodiment of FIG. 10, the single flap 58 is a circular flap covering the entire top surface 54 of the lid—although it is recognized that the flap 58 could be formed to be generally the same size as the opening 56.

In summary, operation of the portion distribution device 10 is achieved by a user be first screwing the base 22 of the measurement chamber body 14 onto a spice bottle or other container. Once affixed to the container, the user inverts the container and rotates lid 12 relative to the measurement chamber body 14 while shaking the container. The substance will then flow from the container through portion opening 44 into a chamber 34, while the portion divider 16 blocks the substance from flowing into the other chambers 34. When the chamber 34 aligned with portion opening 44 is full, the user then turns the lid 12 ¼ turn to align the portion opening 44 with another chamber 34, with the user being able to sense when the ¼ turn has been completed via the ratchet effect provided by the interaction between ratchet system 64 and ratcheting grooves 42. Upon alignment of the portion opening 44 with the next chamber 34, the substance from the container will then flow into the next empty chamber 34 has been distributed through lid opening 35. At any time, the user can conveniently dispense the substance out from the portion distribution device 10 by opening a flap 58 of the lid, to allow the substance to pour out of the opening in premeasured increments.

Therefore, according to one embodiment of the invention, a portion distribution device for portioning substances from a container in pre-defined increments includes a portion divider having a portion opening and a measurement chamber body having first and second ends and rotatively coupled to the portion divider at the first end, with the measurement chamber body further including a plurality of chambers equal in volume and each having an inlet opening and outlet opening and a base joined to the plurality of chambers so as to be positioned at the first end of the measurement chamber body, the base constructed to be selectively connect to the container. The portion distribution device also includes a lid rotatively coupled to the second end of the measurement chamber body, with the lid further including a top surface having at least one lid opening formed therethrough, at least one flap operative to close the at least one lid opening, and a rod extending downward from the top surface, through the measurement chamber body, and coupled to the portion divider.

According to another embodiment of the invention, a container top for dispensing a substance from a container in equal volume increments includes a measurement chamber body having a first and second end, with the measurement chamber body including a base located at the first end and configured to attach to a container and a wall structure coupled to the attachment section and constructed to define a plurality of chambers having equal volume. The container top also includes a portion divider rotatively coupled to the first end of the measurement chamber body and having a portion opening providing a chamber inlet by which each respective chamber of the measurement chamber body can be selectively filled with the substance from the container. The container top further includes a lid covering the second end of the measurement chamber body, with the lid including a top surface having an opening formed therein that provides a chamber outlet by which each respective chamber of the measurement chamber body can be selectively emptied and a shaft extending down from the top surface, through the measurement chamber body, and coupled to the portion divider. The lid is coupled to the portion divider by way of the shaft such that rotation of the lid causes a matching rotation of the portion divider to selectively align the portion opening with a respective chamber in the measurement chamber body, so as to enable selective filling of each of the plurality of chambers in the measurement chamber body with the substance in the container.

According to yet another embodiment of the invention, a method of assembling a portion distribution device includes supplying a measurement chamber body having first and second ends, wherein the measurement chamber body comprises includes a plurality of chambers equal in volume wherein each chamber has an inlet opening and outlet opening, and a base configured to connect to a container. The method also includes rotatively coupling a portion divider to a first end of a measurement chamber body such that a portion opening in the portion divider can be rotated and selectively aligned with each of the plurality of chambers and rotatively coupling a lid to the second end of a measurement chamber body, wherein the lid has at least one lid opening and at least one flap operative to close the opening. The method further includes coupling the lid to the portion divider via a rod extending from the lid, through the measurement chamber body, and that mates with the portion divider. The lid is coupled to the portion divider such that rotation of the lid causes a matching rotation of the portion divider, so as to selectively align the portion opening with a respective chamber in the measurement chamber body and enable selective filling of each of the plurality of chambers in the measurement chamber body with a substance from the container.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portion distribution device for portioning substances from a container in pre-defined increments, the portion distribution device comprising:
   a portion divider having a portion opening;
   a measurement chamber body having first and second ends and rotatively coupled to the portion divider at the first end, wherein the measurement chamber body comprises:
     a plurality of chambers equal in volume and each having an inlet opening and outlet opening; and
     a base joined to the plurality of chambers so as to be positioned at the first end of the measurement chamber body, the base constructed to be selectively connected to the container; and
   a lid rotatively coupled to the second end of the measurement chamber body, the lid comprising:
     a top surface having a first lid opening formed therethrough and a second lid opening formed therethrough;
     a first flap operative to close the first lid opening;
     a second flap operative to close the second lid opening; and
     a rod extending downward from the top surface, through the measurement chamber body, and coupled to the portion divider;
   wherein the first lid opening is aligned with a top surface of the portion divider, so that any chamber of the plurality of chambers aligned with the first lid opening has its inlet opening blocked by the top surface of the portion divider; and wherein the second lid opening is aligned with the portion opening, so that any chamber of the plurality of chambers aligned with the second lid opening has its inlet opening also aligned with the portion opening.

2. The portion distribution device of claim 1 wherein the rod is coupled to the portion divider such that rotation of the lid causes a matching rotation of the portion divider to enable aligning of the portion opening with the inlet opening of a chamber of the plurality of chambers.

3. The portion distribution device of claim 1 wherein the measurement chamber body comprises a cylindrical structure having dividers extending radially from a central axis to an outer wall to define the plurality of chambers.

4. The portion distribution device of claim 3 wherein the measurement chamber body comprises a central axis hole positioned at a center point of the cylindrical measurement chamber body at a meeting point of the dividers, the rod of the lid extending through the central axis hole to couple to the portion divider.

5. The portion distribution device of claim 1 wherein the base of the measurement chamber body comprises screw grooves configured to be screwed on to the container so as to secure the portion distribution device to the container.

6. The portion distribution device of claim 1 wherein the measurement chamber body includes ratcheting grooves formed thereon.

7. The portion distribution device of claim 6 wherein the lid comprises a ratcheting system that interacts with the ratcheting grooves to alert a user when a desired portion has been distributed into one of the plurality of chambers of the measurement chamber body.

8. The portion distribution device of claim 7 wherein the ratcheting system alerts the user every ¼ turn.

9. The portion distribution device of claim 1 wherein each of the plurality of chambers has a volume of ½ teaspoon.

10. The portion distribution device of claim 1 wherein the portion opening is equivalent in size to the inlet opening of one of the plurality of chambers of the measurement chamber body.

11. The portion distribution device of claim 1 wherein the first lid opening and first flap allow dispensing of a substance in a premeasured increment and the second lid opening and second flap allow direct pouring of the substance from the container, allowing a user to select between a measured pour and a free pour.

12. A container top for dispensing a substance from a container in equal volume increments, the container top comprising:
   a measurement chamber body having a first and second end, the measurement chamber body including:
      a base located at the first end and configured to attach to a container; and
      a wall structure coupled to the attachment section and constructed to define a plurality of chambers having equal volume;
   a portion divider rotatively coupled to the first end of the measurement chamber body and having a portion opening providing a chamber inlet by which each respective chamber of the measurement chamber body can be selectively filled with the substance from the container;
   a lid covering the second end of the measurement chamber body, the lid comprising:
      a top surface having a first opening and a second opening formed therein, the first opening providing a chamber outlet by which each respective chamber of the measurement chamber body can be selectively emptied, and the second opening providing a chamber outlet by which each respective chamber of the measurement chamber body can be selectively emptied; and
      a shaft extending down from the top surface, through the measurement chamber body, and coupled to the portion divider;
   wherein the lid is coupled to the portion divider by way of the shaft such that rotation of the lid causes a matching rotation of the portion divider to selectively align the portion opening with a respective chamber in the measurement chamber body, so as to enable selective filling of each of the plurality of chambers in the measurement chamber body with the substance in the container;
   wherein a top surface of the portion divider is aligned with the first opening so that the selective emptying of each respective chamber of the measurement chamber body via the first opening is a measured pouring of a premeasured increment of the substance; and
   wherein the portion opening is aligned with the second opening so that the selective emptying of each respective chamber of the measurement chamber body via the second opening is a direct pouring of the substance from the container.

13. The container top of claim 12 wherein the measurement chamber body comprises:
   screw grooves formed on the base that are configured to mate with the container so as to secure the portion distribution device to the container; and
   one or more ratcheting grooves formed on an outer surface of the wall structure.

14. The container top of claim 13 wherein the lid comprises a bottom section having a ratcheting mechanism formed thereon, the ratcheting mechanism constructed to interact with the one or more ratcheting grooves formed on the outer surface of the wall structure when the lid is turned relative to the measurement chamber body.

15. The container top of claim 14 wherein the ratcheting system interacts with the one or more ratcheting grooves when the lid is turned 90 degrees, so as to alert a user when the portion opening of the portion divider is aligned with a respective chamber in the measurement chamber body.

16. The container top of claim 12 wherein the wall structure comprises:
   a plurality of dividers extending radially outward from a central axis hole of the measurement chamber body; and
   an outer wall surrounding the plurality of dividers and joined thereto to define the plurality of chambers.

17. The container top of claim 12 wherein the shaft of the lid extends down through the central axis hole to couple to the portion divider.

18. The container top of claim 12 wherein the shaft comprises a notch formed on a bottom end thereof, the notch on the shaft configured to mate with a corresponding notch formed on the portion divider to couple the lid to the portion divider.

19. A portion distribution device for portioning substances from a container in pre-defined increments, the portion distribution device comprising:
   a portion divider having a portion opening;
   a measurement chamber body having first and second ends and rotatively coupled to the portion divider at the first end, wherein the measurement chamber body comprises:
      a plurality of chambers equal in volume and each having an inlet opening and outlet opening; and a base joined to the plurality of chambers so as to be positioned at the first end of the measurement chamber body, the base constructed to be selectively connected to the container; and a lid rotatively coupled to the second end of the measurement chamber body, the lid comprising:

a top surface having at least one lid opening formed therethrough;

at least one flap operative to close the at least one lid opening; and a rod extending downward from the top surface, through the measurement chamber body, and coupled to the portion divider;

wherein the inlets of the plurality of chambers fluidly connect the measurement chamber body to the container to allow substances from the container to be transferred into the plurality of chambers of the measurement chamber body; and wherein the portion divider covers the inlet of each of the plurality of chambers except for a single chamber aligned with the portion opening of the portion divider, such that the portion divider controls the transfer of substances from the container into the plurality of chambers of the measurement body and enables only one chamber to be filled at a time.

20. The portion distribution device of claim 19 wherein the portion divider acts as a floor for the substance in the plurality of chambers whose inlet is covered by the portion divider when the bottle is in an upright position, so as to hold the substance in the chambers in its measured quantity until needed.

21. The portion distribution device of claim 19 wherein the measurement chamber body includes ratcheting grooves formed thereon and the lid includes a ratcheting system that interacts with the ratcheting grooves to alert a user when a desired portion has been distributed into one of the plurality of chambers of the measurement chamber body.

22. The portion distribution device of claim 19 wherein the lid is fixedly coupled to the portion divider such that the lid and portion divider are caused to rotate in unison when the lid is turned by a user, such that the lid and portion divider rotate relative to the measurement chamber body; and wherein the at least one opening of the lid may be selectively aligned with the portion opening of the portion divider to provide for a allowing a user to select between a measured pour and a free pour.

* * * * *